United States Patent
Moriuchi et al.

(10) Patent No.: US 10,382,684 B2
(45) Date of Patent: Aug. 13, 2019

(54) IMAGE PROCESSING APPARATUS AND IMAGE CAPTURING APPARATUS

(71) Applicant: KABUSHIKI KAISHA TOSHIBA, Tokyo (JP)

(72) Inventors: Yusuke Moriuchi, Tokyo (JP); Nao Mishima, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 51 days.

(21) Appl. No.: 15/237,744

(22) Filed: Aug. 16, 2016

(65) Prior Publication Data

US 2017/0054910 A1 Feb. 23, 2017

(30) Foreign Application Priority Data

Aug. 20, 2015 (JP) .................................. 2015-162888
May 16, 2016 (JP) .................................. 2016-097910

(51) Int. Cl.
*G02B 5/20* (2006.01)
*G06T 5/00* (2006.01)
(Continued)

(52) U.S. Cl.
CPC ......... *H04N 5/23267* (2013.01); *G02B 5/201* (2013.01); *G06T 5/003* (2013.01);
(Continued)

(58) Field of Classification Search
None
See application file for complete search history.

(56) References Cited

U.S. PATENT DOCUMENTS

2007/0279618 A1* 12/2007 Sano .................. G06T 5/20
356/72
2011/0279699 A1* 11/2011 Matsui ................ H04N 5/20
348/222.1

(Continued)

FOREIGN PATENT DOCUMENTS

CN      102256056 A    11/2011
JP      2014-26051    2/2014
(Continued)

OTHER PUBLICATIONS

Shinsaku Hiura and Takashi Matsuyama, "Depth Measurement by the Multi-Focus Camera", Date of Conference: Jun. 25-25, 1998, Date Added to IEEE Xplore: Aug. 6, 2002, Print ISBN: 0-8186-8497-6 (Year: 2002).*

(Continued)

*Primary Examiner* — Roberto Velez
*Assistant Examiner* — Quan Pham
(74) *Attorney, Agent, or Firm* — Finnegan, Henderson, Farabow, Garrett & Dunner, L.L.P.

(57) ABSTRACT

An image capturing apparatus includes a sensor controller and a distance calculator. The sensor controller acquires a target image and a first reference image. The point spread function (PSF) of the target image is point-asymmetric, and the PSF of the first reference image being point-symmetric. The image sensor receives light having passed through a filter region that changes PSFs for sensor images of at least one kind into point-asymmetric forms, and then generates the target image for which a PSF has been changed into a point-asymmetric form by the filter region, and the first reference image that is not the target image. The distance calculator calculates the distance to an object captured in the target image and the first reference image, in accordance with the correlations each between an image obtained by (Continued)

convoluting a blur kernel to the target images and the first reference image.

15 Claims, 16 Drawing Sheets

(51) Int. Cl.
*G06T 5/20* (2006.01)
*G06T 7/571* (2017.01)
*H04N 5/225* (2006.01)
*H04N 5/232* (2006.01)

(52) U.S. Cl.
CPC ............. *G06T 5/20* (2013.01); *G06T 7/571* (2017.01); *H04N 5/2254* (2013.01)

(56) References Cited

U.S. PATENT DOCUMENTS

| | | | | |
|---|---|---|---|---|
| 2012/0057043 A1* | 3/2012 | Yamamoto | ............. | G02B 7/285 348/222.1 |
| 2013/0258096 A1* | 10/2013 | Ali | ..................... | H04N 5/23212 348/135 |
| 2013/0341493 A1* | 12/2013 | Ando | ....................... | G01C 3/32 250/208.1 |
| 2015/0248769 A1 | 9/2015 | Ukil et al. | | |
| 2015/0302596 A1 | 10/2015 | Mizukami et al. | | |
| 2016/0154152 A1 | 6/2016 | Moriuchi et al. | | |
| 2016/0255323 A1* | 9/2016 | Wajs | .................. | H04N 13/0018 348/49 |
| 2016/0295098 A1* | 10/2016 | Li | ....................... | H04N 5/23212 |

FOREIGN PATENT DOCUMENTS

| | | |
|---|---|---|
| JP | 2014-96062 | 5/2014 |
| JP | 2015-173441 | 10/2015 |
| JP | 2016-102733 | 6/2016 |

OTHER PUBLICATIONS

Yusuke Moriuchi Takayuki Sasaki Nao Mishima Takeshi Mita, "Depth from Asymmetric Defocus using Color-Filtered Aperture", Society for Information Display, vol. 48, Issuel, May 2017, pp. 325-328 (Year: 2017).*

Furuta, R., et al., "Coarse-To-Fine Strategy for Efficient Cost-Volume Filtering", 2014 IEEE International Conference on Image Processing (ICIP), pp. 3793-3797 (2015).

Smirnov, S., et al., "Fast hierarchical cost volume aggregation for stereo-matching", 2014 IEEE International Visual Communications and Image Processing Conference, VCIP 2014, No. 7061615, pp. 498-501 (2015).

* cited by examiner

IMAGE PROCESSING APPARATUS AND IMAGE CAPTURING APPARATUS

CROSS-REFERENCE TO RELATED APPLICATIONS

This application is based upon and claims the benefit of priority from Japanese Patent Application No. 2015-162888, filed on Aug. 20, 2015; and Japanese Patent Application No. 2016-097910, filed on May 16, 2016, the entire contents of all of which are incorporated herein by reference.

FIELD

Embodiments described herein relate generally to an image processing apparatus and an image capturing apparatus.

BACKGROUND

Conventionally, there has been a technique for generating a multiple-viewpoint image formed by imaging parts of light that have passed through different regions of the lens by dividing lenses or apertures of an imaging optical system or pixels in an image sensor. This technique is configured to calculate the phase difference between multiple-viewpoint images by searching the multiple-viewpoint images for pixels in which the same object is captured, so that the distance to the object captured in the pixels is found from the phase difference. Different multiple-viewpoint images are different in blur shape (point spread function). For this reason, in the technique above, a blur in an image is corrected into a natural blur having a circular or like shape, based on the calculated phase difference.

However, the above-mentioned technique is inconvenient in that highly accurate distance measurement is difficult. Specifically, in the conventional technique, highly accurate distance measurement is difficult because different point spread functions are used for the respective multiple-viewpoint images in calculating degrees of coincidence for calculating the phase difference.

DETAILED DESCRIPTION

According to an embodiment, an image capturing apparatus includes a sensor controller and a distance calculator. The sensor controller acquires a target image and a first reference image. The point spread function (PSF) of the target image is point-asymmetric, and the PSF of the first reference image being point-symmetric. The image sensor receives light having passed through a filter region that changes PSFs for sensor images of at least one kind into point-asymmetric forms, and then generates the target image for which a PSF has been changed into a point-asymmetric form by the filter region, and the first reference image that is not the target image. The distance calculator calculates the distance to an object captured in the target image and the first reference image, in accordance with the correlations each between an image obtained by convoluting a blur kernel to the target images and the first reference image.

First Embodiment

Figure 1:
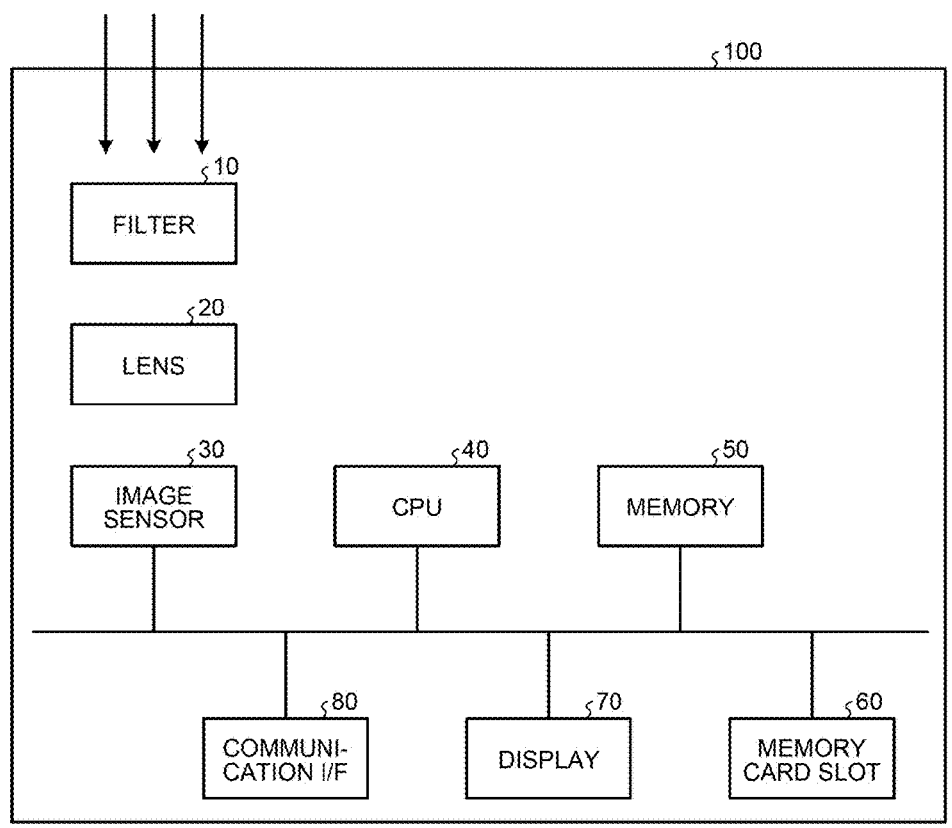
FIG. 1 is a block diagram illustrating a hardware configuration of an image capturing apparatus according to a first embodiment.

FIG. 1 is a block diagram illustrating an example of the hardware configuration of an image capturing apparatus according to a first embodiment. As illustrated in FIG. 1, an image capturing apparatus 100 includes a filter 10, a lens 20, an image sensor 30, a central processing unit (CPU) 40, a memory 50, a memory card slot 60, a display 70, and a communication interface (I/F) 80. The image sensor 30, the CPU 40, the memory 50, the memory card slot 60, the display 70, and the communication I/F 80 are connected to one another through a bus. The image capturing apparatus 100 captures an image of any desired object and generates a distance image that indicates information on the depth to the object.

In the example illustrated in FIG. 1, arrows going toward the filter 10 represent incidence of light. The filter 10 may be installed in any desired optical system in the image capturing apparatus 100. For example, the optical system in the image capturing apparatus 100 indicates a component such as the lens 20 or the image sensor 30. That is, the filter 10 may be installed inside or in an aperture of the lens 20, or between the lens 20 and the image sensor 30. The filter 10 receives light reflected by the object as a result of image capturing, and transmits the received light. Consequently, a point spread function (PSF) of a sensor image of at least one kind among sensor images of plurality of kinds captured by the image sensor 30 is changed into a point-asymmetric function. The following description illustrates a case where the filter 10 is provided in the aperture of the lens 20.

The lens 20, when condensing light that has entered it, transmits light within specific wavelength bands depending on colors of the filter 10 provided in the aperture thereof. Light having passed through the filter 10 and the lens 20 reaches the image sensor 30. The image sensor 30 receives light having passed through the lens 20 and the filter 10 installed in the aperture of the lens 20. For example, the image sensor 30 includes two or more sensors, and generates a target image and a reference image as a result of passing of light through the filter 10. The target image is an image for which a point spread function has been changed into a point-asymmetric function. The reference image is a sensor image of at least one kind. The two or more sensors mean, for example, a combination of two or more sensors in an RGB sensor, such as R and G sensors, G and B sensors, R and B sensors, or R, G, and B sensors. For example, any one sensor (a first sensor) of the two or more sensors generates a target image, and the other sensor (a second sensor) generates a reference image.

For example, the image sensor 30 is an image sensor such as a charge coupled device (CCD) image sensor or a complementary metal oxide semiconductor (CMOS) image sensor. In one implementation, the image sensor 30 includes a sensor (R sensor) that receives red light, a sensor (G sensor) that receives green light, and a sensor (B sensor) that receives blue light, and generates captured images (an R image, a G image, and a B image) by receiving light in the corresponding wavelength bands through the respective sensors.

The CPU 40 integrally controls operation of the image capturing apparatus 100. Specifically, the CPU 40 executes a computer program stored in the memory 50 or the like, thereby controlling operation of the entirety of the image capturing apparatus 100. The memory 50 is a rewritable non-volatile storage device such as a hard disk drive (HDD) or a NAND-type flash memory. For example, the memory 50 stores therein computer programs relating to control of the image capturing apparatus 100, various kinds of data to be used in processing, and the like. A portable storage medium such as an SD memory card or an SDHC memory card can be inserted into the memory card slot 60. The display 70 is a liquid crystal display, a touch panel, or the like. The communication I/F 80 is an interface that controls communication with an external device and input of various instructions from a user.

Figure 2:
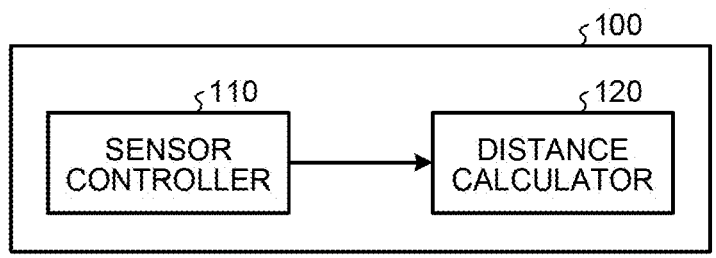
FIG. 2 is a block diagram illustrating a functional configuration of the image capturing apparatus according to the first embodiment.

FIG. 2 is a block diagram illustrating an example of the functional configuration of the image capturing apparatus 100 according to the first embodiment. As illustrated in FIG. 2, the image capturing apparatus 100 includes a sensor controller 110 and a distance calculator 120. The sensor controller 110 and the distance calculator 120 may be implemented partially or entirely by software (computer programs) or by hardware circuitry.

The sensor controller 110 controls the image sensor 30 to acquire a target image for which a point spread function has been changed so as to be point-asymmetric, and a reference image, that is, a sensor image of at least one kind. The distance calculator 120 finds, from a plurality of convolution kernels, the convolution kernel that results in one restored image from restored images obtained by convoluting blur kernels to the target image by the plurality of convolution kernels, the one restored image having the highest correlation with the reference image. The distance calculator 120 thus calculates the distance to an object captured in an image and outputs a distance image. The respective convolution kernels are functions that convolute different blur kernels to the target image. The following describes details of processing according to the first embodiment with reference to a flowchart.

Figure 3:
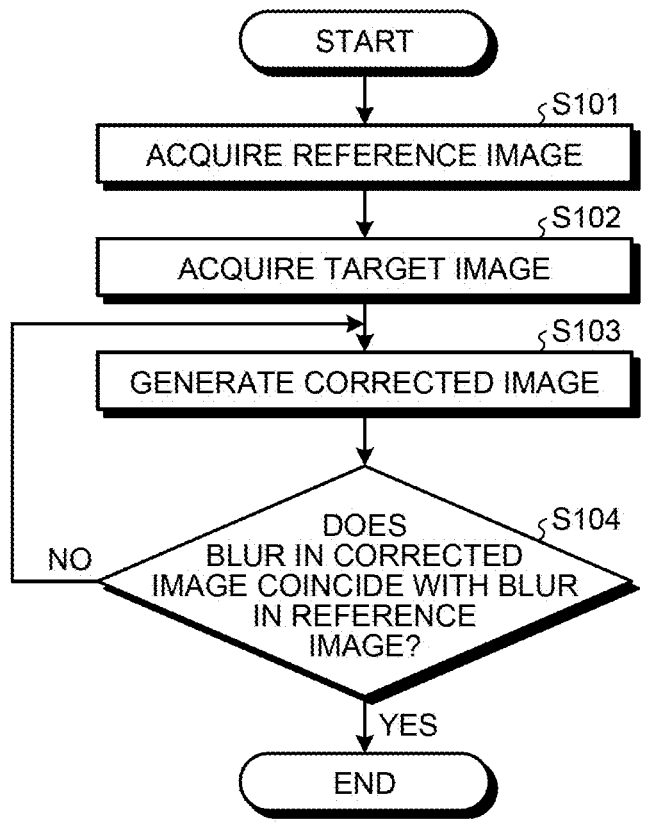
FIG. 3 is a flowchart illustrating a procedure of image processing according to the first embodiment.

FIG. 3 is a flowchart illustrating an example of the procedure of image processing according to the first embodiment. Although the following description illustrates a case where the image sensor 30 includes an RGB sensor, wavelength bands to which the image sensor 30 corresponds are not limited to this case.

First, when light reflected by an object in image capturing passes through the filter 10, a point spread function for a sensor image of at least one kind among sensor images observed in the image sensor 30 is changed into a point-asymmetric function. Filter regions in the filter 10 attenuate any desired kind of light among light received by the image sensor 30 or bring the distribution of concentration of light rays into a lopsided state, thereby being capable of changing a point spread function for a sensor image.

Figure 4:
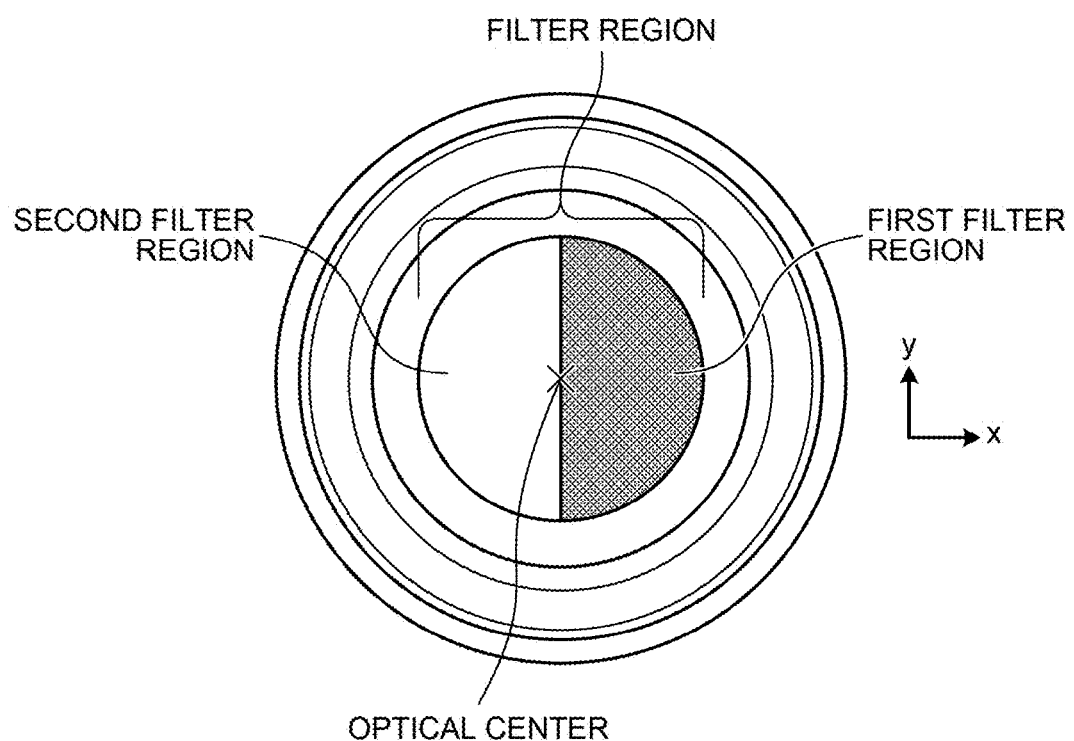
FIG. 4 is a diagram illustrating a configuration of filter regions according to the first embodiment.

FIG. 4 is a diagram illustrating an example of the configuration of the filter regions according to the first embodiment. As illustrated in FIG. 4, a first filter region among the filter regions in the filter 10 is set so as not to be point-symmetric with respect to the center point (a point located at the centroid) of the filter regions, which is the optical center. In the example illustrated in FIG. 4, a yellow filter (Y filter) in the filter regions is defined as the first filter region, and a region of the filter regions that is not the first filter region is defined as a second filter region. That is, the yellow filter (Y filter), which is the first filter region, does not have a shape point-symmetric with respect to the optical center.

Figure 5:
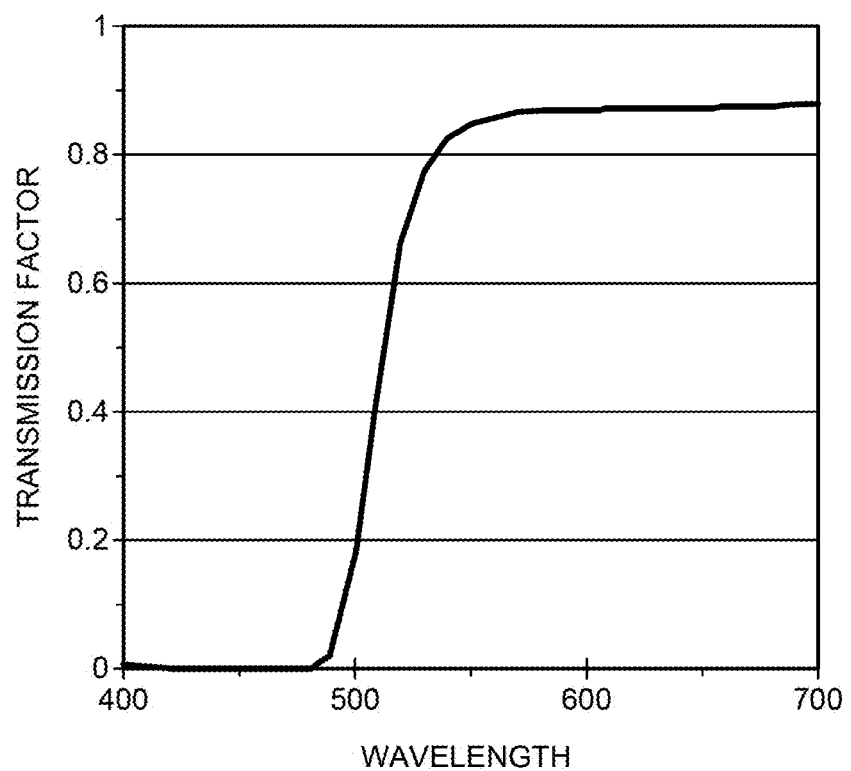
FIG. 5 is a diagram illustrating a transmission factor characteristic of a first filter region according to the first embodiment.

FIG. 5 is a diagram illustrating an example of the transmission factor characteristic of the first filter region (Y filter) according to the first embodiment. As illustrated in FIG. 5, the first filter region (Y filter) transmits red light and green light, and attenuates blue light. The first filter region may be a filter that changes the transmission factor characteristic for any desired wavelength band, a polarizing filter (polarizing plate) that allows light polarized in any desired direction to pass therethrough, or a microlens that changes light concentration power for any desired wavelength band. For example, the filter that changes the transmission factor for any desired wavelength band may be a primary color filter (RGB), a complementary color filter (CMY), a color correction filter (CC-RGB/CMY), an infrared cut filter, an ultraviolet cut filter, a neutral density (ND) filter, or a shielding plate. When the first filter region is a microlens, the lens 20 brings the distribution of concentration of light rays to a lopsided state, so that a point spread function changes.

Any desired number of filter regions may be defined in the filter 10 as long as each of these filter regions is not point-symmetric. In addition, the filter 10 may include a single filter region that changes point spread functions for a plurality of sensor images.

The first filter region preferably has a shape that divides the filter 10 with any straight line, which is preferably a straight line that passes through the optical center. With the first filter region having a shape that divides the filter 10 with any straight line, the number of dimensions of a blur correction filter described later can be reduced. Furthermore, with the straight line that passes through the optical center, a structure can be formed that can change point spread functions for sensor images even when a diaphragm such as a shield for adjusting the quantity of light has been inserted.

The image sensor 30 receives light that is included in light transmitted by the filter regions in the filter 10 and that has passed through any one of the filter regions without being attenuated, and generates a reference image. Thus, the sensor controller 110 acquires the reference image generated by the image sensor 30 (Step S101). "Any one of the filter regions" means either the first filter region or the second filter region in the example illustrated in FIG. 4. A point spread function for the reference image does not change very much before and after the passage through the filter regions. In the case of the filter regions illustrated in FIG. 4, red light and green light having passed therethrough without being attenuated through a yellow filter (Y filter), which is the first filter region, are received by the image sensor 30. Consequently, an R image and a G image are generated as the reference images. The R image and the G image contain circular point spread functions, and blur shapes therein are circular.

The image sensor 30 also receives light for which a point spread function has been changed when passing through the first filter region, the light being included in light transmitted by the filter regions in the filter 10, and generates a target image. Thus, the sensor controller 110 acquires the target image generated by the image sensor 30 (Step S102). The point spread function for the target image has been changed into a point-asymmetric shape through the first filter region. In the case of the filter regions illustrated in FIG. 4, blue light having passed therethrough while being attenuated through a yellow filter (Y filter), which is the first filter region, is received by the image sensor 30. Consequently, a B image is generated as the target image. That is, of blue light passing through the filter regions in the filter 10, blue light passing through the first filter region is absorbed and blue light passing through the second filter region passes therethrough without being absorbed. Consequently, in the case of the filter 10 illustrated in FIG. 4, the point spread function for the target image is changed from a circular to a semicircular shape when passing through the filter regions, thus resulting in a semicircular blur shape.

Figure 6:
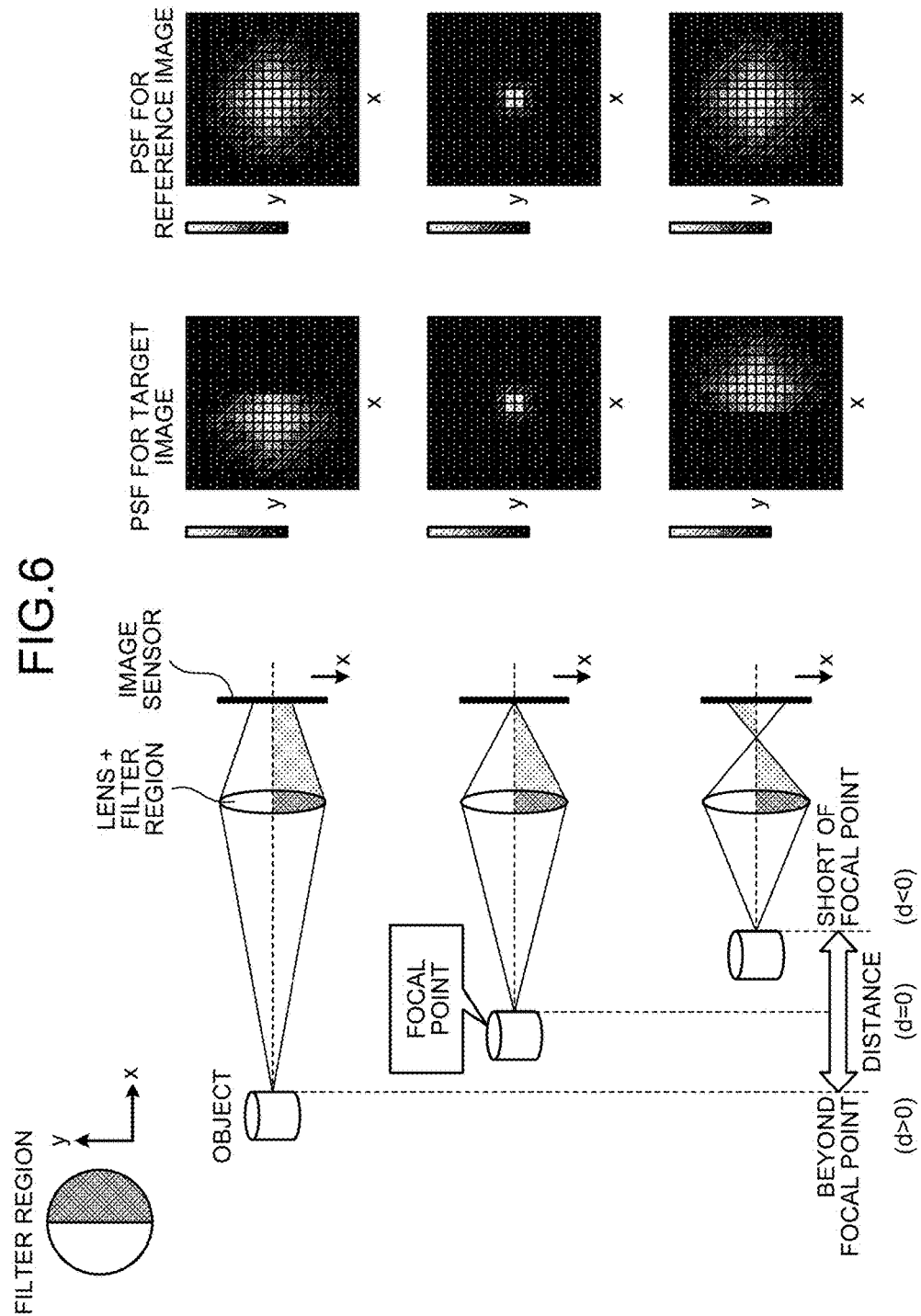
FIG. 6 is a diagram explaining a relation between a distance to an object and a shape of a point spread function, according to the first embodiment.

FIG. 6 is a diagram explaining a relation between a distance to an object and a shape of a point spread function, according to the first embodiment. As illustrated in FIG. 6, when an object captured in an image is on the far side of the focal point, that is, "d>0", a blur lopsided to the left as compared with a blur in a reference image is captured in a target image. In contrast, when an object captured in an image is on the near side of the focal point, that is, "d<0", a blur lopsided to the right as compared with a blur in a reference image is captured in a target image. When an object captured in an image is located at the focal point, that is "d=0", images without blurs are captured as a target image and as a reference image. This embodiment utilizes this characteristic in calculating the distance of a captured scene.

The distance calculator 120 convolutes a blur kernel from among different blur kernels to the target image based on the target image and the reference image that have been acquired by the sensor controller 110, thereby generating a restored image in which a blur shape has been corrected from that in the target image (Step S103). As described above, blur shapes in the target image and the reference image vary depending on the distances d to the object captured in the images. In this embodiment, the distance to an object captured in an image is calculated as follows: restored images are generated in such a manner that a blur shape in the target image is corrected for the respective assumed distances d through convolution kernels that have been produced; and the distance d that results in the generated restored image having the highest correlation with the reference image is calculated. A technique for calculating the correlation between a restored image and a reference image is described later.

Here, if the distance to the focal point of the camera from an object captured in a captured image Ix is denoted by d, the captured image Ix can be expressed as Mathematical Formula (1) using an ideal captured image Iy having minor blur, and a point spread function f(d) for the captured image.

$$Ix = f(d) * Iy \quad (1)$$

Figure 7:
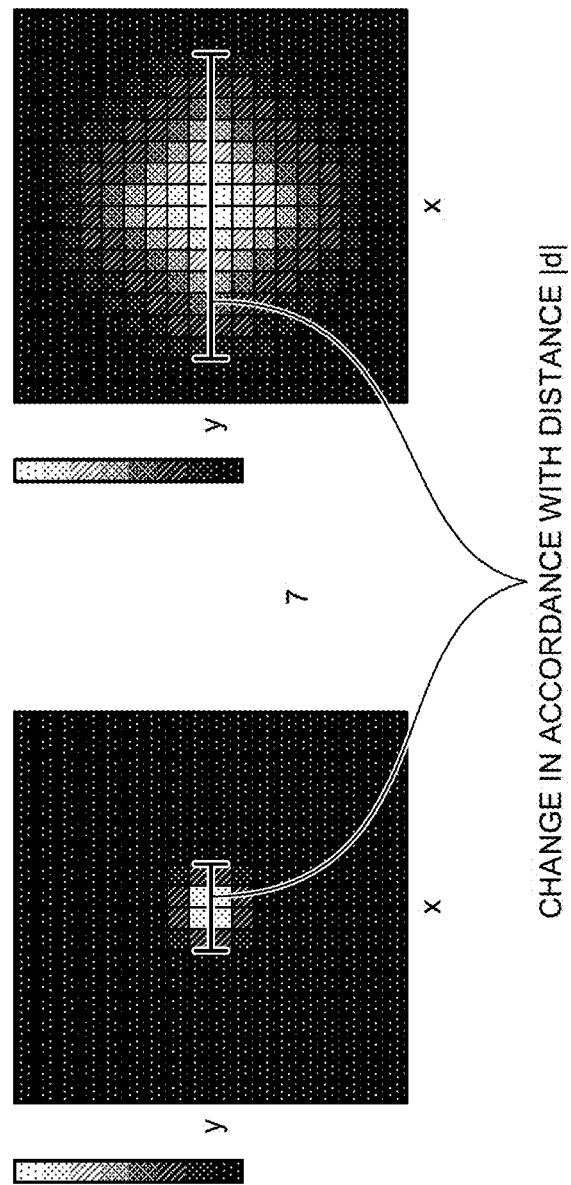
FIG. 7 is a diagram illustrating a point spread function for a reference image, according to the first embodiment.

The point spread function f(d) for the captured image is determined based on the shape of an aperture of the image capturing apparatus 100 and the distance d. The distance d is determined with reference to the focal point, and is expressed as: "d>0" when the object is on the far side of the focal point; and "d<0" when the object is on the near side of the focal point. FIG. 7 is a diagram illustrating an exemplary point spread function for a reference image, according to the first embodiment. As illustrated in FIG. 7, in the case of the filter regions illustrated in FIG. 4, the aperture has a circular shape, which is point-symmetric. The shape of the point spread function f(d) does not differ between the near and the far sides of the focal point. The point spread function f(d) can be therefore expressed as a Gaussian function indicating that the width of blur changes according to the size |d| of the distance d. Alternatively, the point spread function f(d) can be expressed as a pillbox function representing that the width of blur changes according to the size |d| of the distance d.

A reference image $Ix_r$ can be expressed as Mathematical Formula (2) using a point spread function $f_r(d)$ determined based on the aperture shape and the characteristics of the filter regions as in the case of Mathematical Formula (1).

$$Ix_r = f_r(d) * Iy \quad (2)$$

A target image $Ix_o$ can be expressed as Mathematical Formula (3) using a point spread function $f_o(d)$ determined based on the aperture shape and the characteristics of the filter regions as in the case of Mathematical Formula (1).

$$Ix_o = f_o(d) * Iy \quad (3)$$

Figure 8:
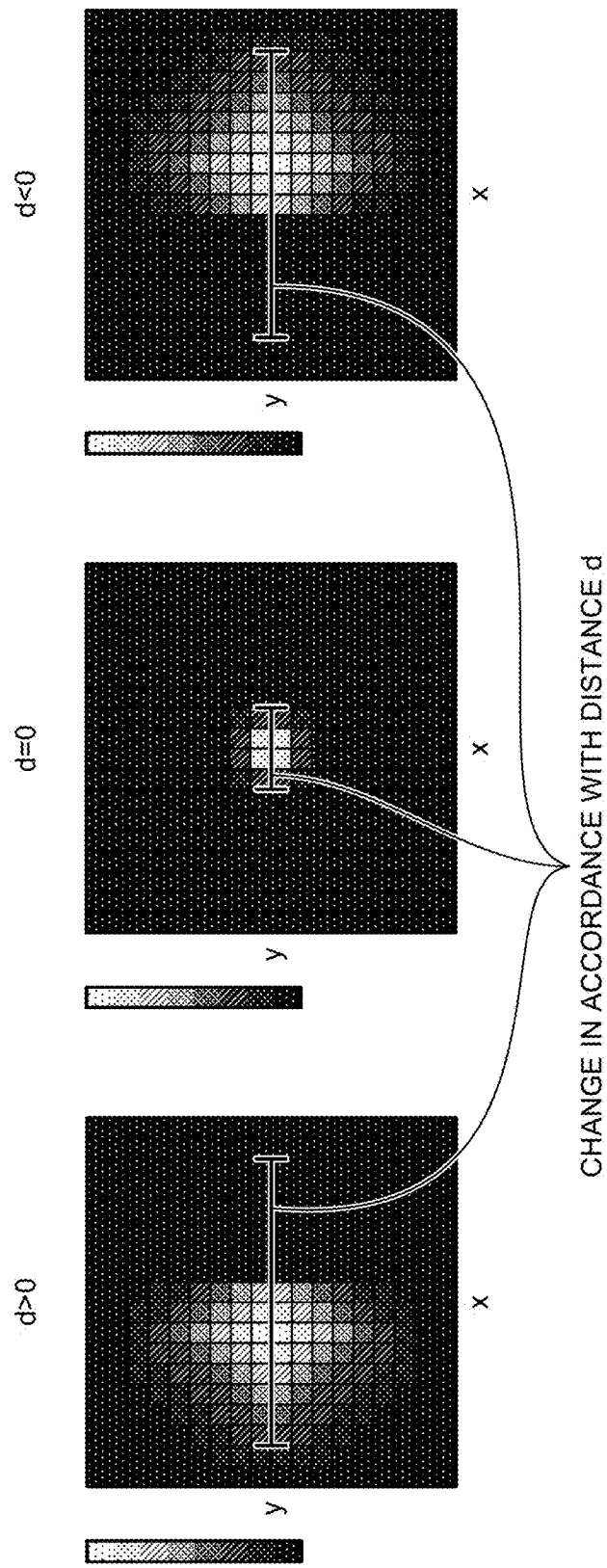
FIG. 8 is a diagram illustrating a point spread function for a target image, according to the first embodiment.

In the case of the filter regions illustrated in FIG. 4, $f_r(d) = f(d)$ because the reference image is not affected by the first filter region. The shape of the point spread function $f_o(d)$ differs between positions on the near and the far sides of the focal point where d=0, as a result of the effect of optical attenuation through the first filter region. FIG. 8 is a diagram illustrating an exemplary point spread function for a target image, according to the first embodiment. As illustrated in FIG. 8, when the object is on the far side of the focal point (d>0), the point spread function $f_o(d)$ for the target image is represented by a Gaussian function of the width |d| of blur attenuated according to optical attenuation through the first filter region for the region where x>0. When the object is on the near side of the focal point (d<0), the point spread function $f_o(d)$ for the target image is represented by a Gaussian function of the width |d| of blur attenuated according to optical attenuation through the first filter region for the region where x<0.

Here, a point spread function for convoluting blur kernel to the target image $Ix_o$ to match the blur shape in the target image $Ix_o$ with the blur shape in the reference image $Ix_r$ is defined as a convolution kernel $f_c(d)$. The convolution kernel $f_c(d)$ can be expressed as Mathematical Formula (4).

$$Ix_r = f_c(d) * Ix_o \quad (4)$$

The convolution kernel $f_c(d)$ in Mathematical Formula (4) can be expressed as Mathematical Formula (5) using the point spread function $f_r(d)$ for the reference image $Ix_r$ and the point spread function $f_o(d)$ for the target image $Ix_o$, from Mathematical Formulae (2) to (4).

$$f_c(d) = f_o(d) * f_o^{-1}(d) \quad (5)$$

In Mathematical Formula (5), "$f_o^{-1}(d)$" is an inverse filter of the point spread function $f_o(d)$ for the target image. The convolution kernel $f_c(d)$ can be analyzed and calculated from these formulae, based on the point spread functions for the reference image $IX_r$ and the target image $Ix_o$, respectively. In addition, the blur shape in the target image $Ix_o$ can be corrected variously using the convolution kernels $f_c(d)$ corresponding to any assumed distances d.

Figure 9:
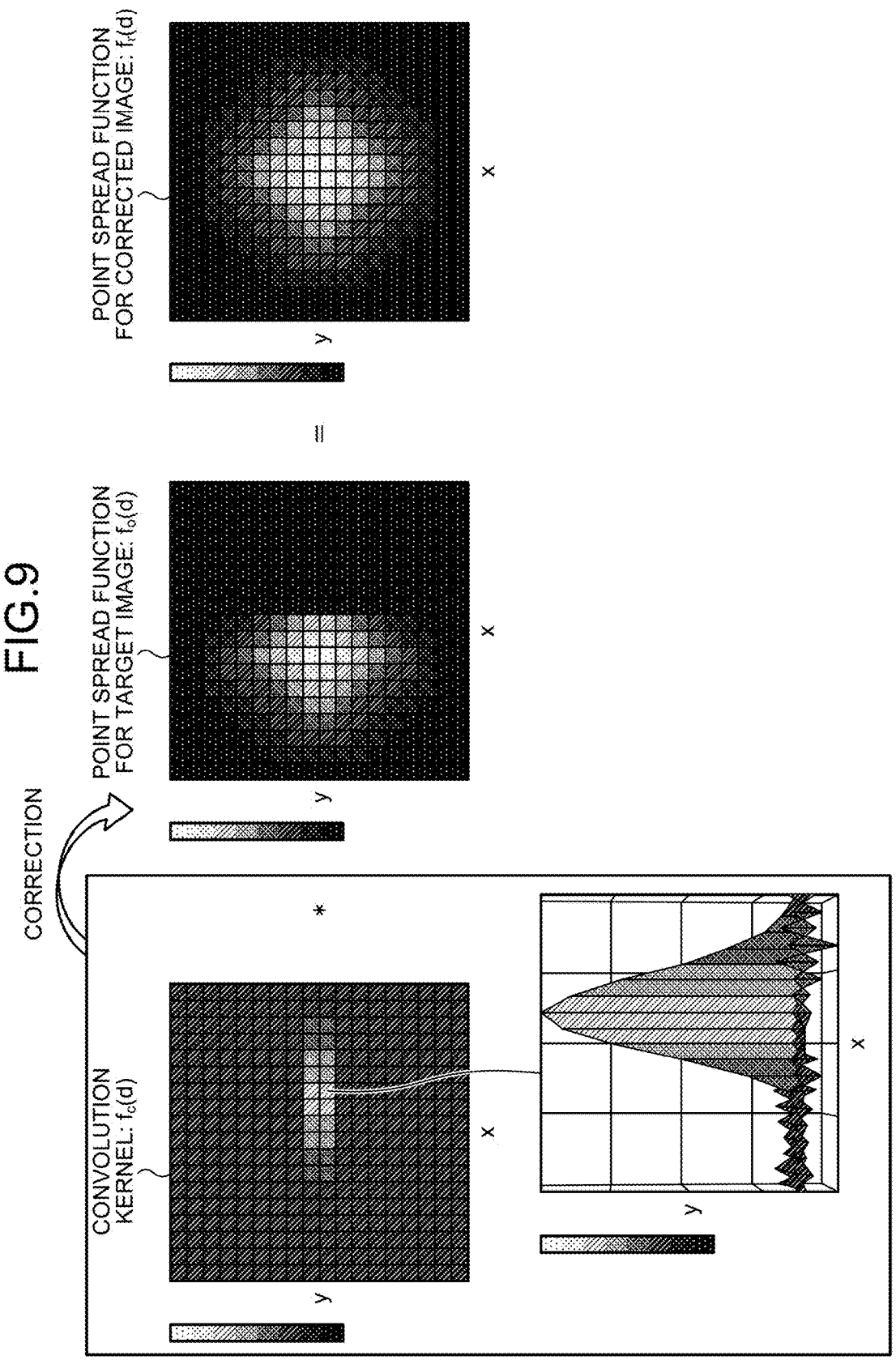
FIG. 9 is a diagram illustrating a convolution kernel according to the first embodiment.

FIG. 9 is a diagram illustrating an exemplary convolution kernel according to the first embodiment. The convolution kernel illustrated in FIG. 9 is a convolution kernel in the case where the filter regions illustrated in FIG. 4 is used. As illustrated in FIG. 9, when the filter regions are defined as having shapes resulting from the division with any straight line, the convolution kernel $f_c(d)$ is distributed on a straight line (near a straight line) that passes through the center of the line segment dividing these filter regions from each other and that is perpendicular to the line segment. Here, if $Ix\hat{}_o(d)$ denotes a restored image obtained by correcting the blur shape in the target image $Ix_o$ using the convolution kernel $f_c(d)$ for any desired distance d, the restored image $Ix\hat{}_o(d)$ can be expressed as Mathematical Formula (6). "$Ix\hat{}$" is defined herein as being equivalent to Ix with a hat symbol above it.

$$I\hat{x}_o(d) = f_c(d) * Ix_o \quad (6)$$

The distance calculator 120 then compares the generated restored image $Ix\hat{}_o(d)$ and the reference image $Ix_r$ with each other to determine whether the blur shapes in the restored image $Ix\hat{}_o(d)$ and the reference image $Ix_r$ coincide with each other (Step S104). If the blur shapes in the restored image $Ix\hat{}_o(d)$ and the reference image $Ix_r$ coincide with each other (Yes at Step S104), the distance calculator 120 ends the processing. On the other hand, if the blur shapes in the restored image $Ix\hat{}_o(d)$ and the reference image $Ix_r$ do not coincide with each other (No at Step S104), the distance calculator 120 executes processing at Step S103 again. That is, the distance calculator 120 finds, with respect to each pixel in a captured image, the distance d such that the blur shapes in the restored image $Ix\hat{}_o(d)$ and in the reference image $Ix_r$ best coincide with each other. The "coinciding" may mean not only that there is perfect coincidence between the blur shapes but also that the degree of coincidence is less than a certain threshold (as described later). The degree of coincidence between the blur shapes can be calculated by calculating the correlation between the restored image $Ix\hat{}_o$(d) and the reference image $Ix_r$ in a rectangular region of any desired size that has a corresponding pixel at its center. This calculation of the degree of coincidence between the blur shapes can be implemented by use of any of existing similarity evaluation techniques. Each of these similarity evaluation techniques enables the distance calculator 120 to calculate the distance d such that the correlation between the restored image $Ix\hat{}_o(d)$ and the reference image $Ix_r$ is the highest and thereby calculate the distance to the object captured in each pixel.

For example, the sum of squared differences (SSD), the sum of absolute differences (SAD), normalized cross-correlation (NCC), zero-mean normalized cross-correlation (ZNCC), Color Alignment Measure, and ZNCC for the Edge image may be applicable as the existing similarity evaluation techniques. In this embodiment, Color Alignment Measure is employed, which utilizes a characteristic of color component of a natural image that they locally have a linear relation therebetween.

In Color Alignment Measure, an indicator L representing a correlation is calculated from the variance of the color distribution in a local border region that has a target pixel in a captured image at its center. An indicator L(d) is calculated in a local region having, at its center, each pixel in an RGB image generated from a reference image $Ix_r$ captured by the image sensor 30 and a restored image $Ix\hat{}_o(d)$ that have been obtained on the assumption that the distance is d. In the case of the filter regions illustrated in FIG. 4, the indicator L(d) is calculated by Mathematical Formula (7) for each pixel in color images generated from a restored image $B\hat{}(d)$ obtained by correcting, through a convolution kernel corresponding to the distance d, an R image, a G image, and a B image captured by the image sensor 30. "$B\hat{}$" is defined herein as being equivalent to B with a hat symbol above it.

$$L(d) = \lambda_0 \lambda_1 \lambda_2 / \sigma_R^2 \sigma_G^2 \sigma_{\hat{B}(d)}^2 \quad (7)$$

In Mathematical Formula (7), $\lambda_0$, $\lambda_1$, and $\lambda_2$ are variances along the principal component axes of the color distribution of an image (eigenvalues of the covariance matrix of the image). In Mathematical Formula (7), $\sigma_R^2$, $\sigma_G^2$, and $\sigma_B^2$ are variances along the R axis, the G axis, and the B axis in the color distribution of the image. Therefore, a smaller value of the indicator L(d) indicates that the degree of coincidence among the color images is higher. Thus, the distance calculator 120 determines whether the indicator L(d) is less than a threshold at Step S104, and, if the indicator L(d) is less than the threshold, ends distance estimation for the target pixel. If the indicator L(d) is not less than the threshold, the distance calculator 120 returns to processing at Step S103 to generate a restored image for the distance d of a different value. Alternatively, the distance to the object imaged in each pixel may be calculated not based on condition determination using a threshold but in such a manner that, after values of the indicator L(d) corresponding to all of the assumed distances d are calculated, the distance d that minimizes the indicator L(d) is found. In addition, for example, a distance image can be generated, as a result of finding the distances to individual objects, as an image in which an object located more distantly appears darker while an object located nearer appears brighter.

As described above, the distance to an object captured in an image is calculated as follows: restored images are generated in such a manner that a blur shape in a target image after being changed in accordance with filter regions installed in an optical system in the image capturing apparatus 100 is corrected through convolution kernels for the respective assumed distances d; and the distance d that results in the generated restored image having the highest correlation with the reference image is calculated. According to this embodiment, the distance is calculated with the correlation of an image the sampling position of which coincides with that of a point spread function, so that highly accurate distance estimation can be implemented. Furthermore, according to this embodiment, blur information obtained as a result of convolution of spatial information is utilized, so that: results of distance estimation are stable; and highly accurate distance estimation can be implemented without involvement of a repetitive pattern and the hidden surface problem.

Second Embodiment

Figure 10:
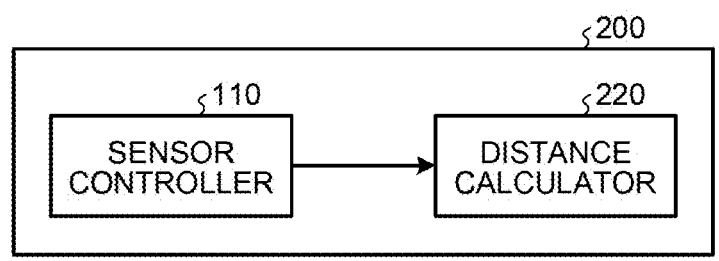
FIG. 10 is a block diagram illustrating a functional configuration of an image capturing apparatus according to a second embodiment.

FIG. 10 is a block diagram illustrating an example of the functional configuration of an image capturing apparatus 200 according to the second embodiment. In the second embodiment, the same reference signs are given to the same components as those in the image capturing apparatus 100 in the first embodiment, and detailed description of such components may be omitted. Specifically, the second embodiment differs from the first embodiment in the function of a distance calculator 220, which is described below. The hardware configuration of the image capturing apparatus 200 according to the second embodiment is different in configuration of the filter 10 from the hardware configuration of the image capturing apparatus 100 according to the first embodiment. Filter regions according to the second embodiment are described later.

As illustrated in FIG. 10, the image capturing apparatus 200 includes the sensor controller 110 and the distance calculator 220. The sensor controller 110 and the distance calculator 220 may be implemented partially or entirely by software (computer programs) or by hardware circuitry. As in the case of the first embodiment, the image capturing apparatus 200 captures an image of any desired object and generates a distance image that indicates information on the depth to the object.

The distance calculator 220 finds, from a plurality of convolution kernels, the convolution kernel that results in one restored image from restored images obtained by convoluting blur kernel to a target image by the plurality of convolution kernels, the one restored image having the highest correlation with a second reference image. The distance calculator 220 thus calculates the distance to an object captured in an image and outputs a distance image. The second reference image is an image in which blur has been corrected by convoluting blur kernel to any one sensor image of a plurality of sensor images. The following describes details of processing according to the second embodiment with reference to a flowchart.

Figure 11:
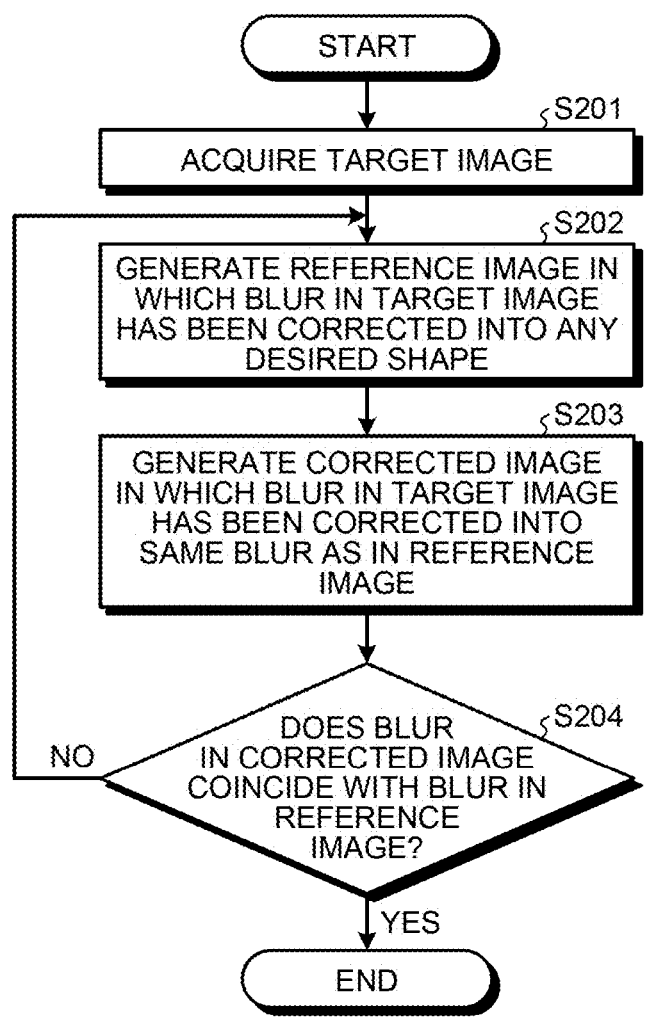
FIG. 11 is a flowchart illustrating a procedure of image processing according to the second embodiment.

FIG. 11 is a flowchart illustrating an example of the procedure of image processing according to the second embodiment. Although the following description illustrates a case where the image sensor 30 includes an RGB sensor, wavelength bands to which the image sensor 30 corresponds are not limited to this case.

First, when light reflected by an object in image capturing passes through the filter 10, a point spread function for a sensor image of at least one kind among sensor images observed in the image sensor 30 is changed into a point-asymmetric function. Filter regions according to the second embodiment are capable of changing a point spread function for a sensor image by attenuating any desired kind of light among light received by the image sensor 30 or by bringing the distribution of concentration of light rays to a lopsided state.

Figure 12:
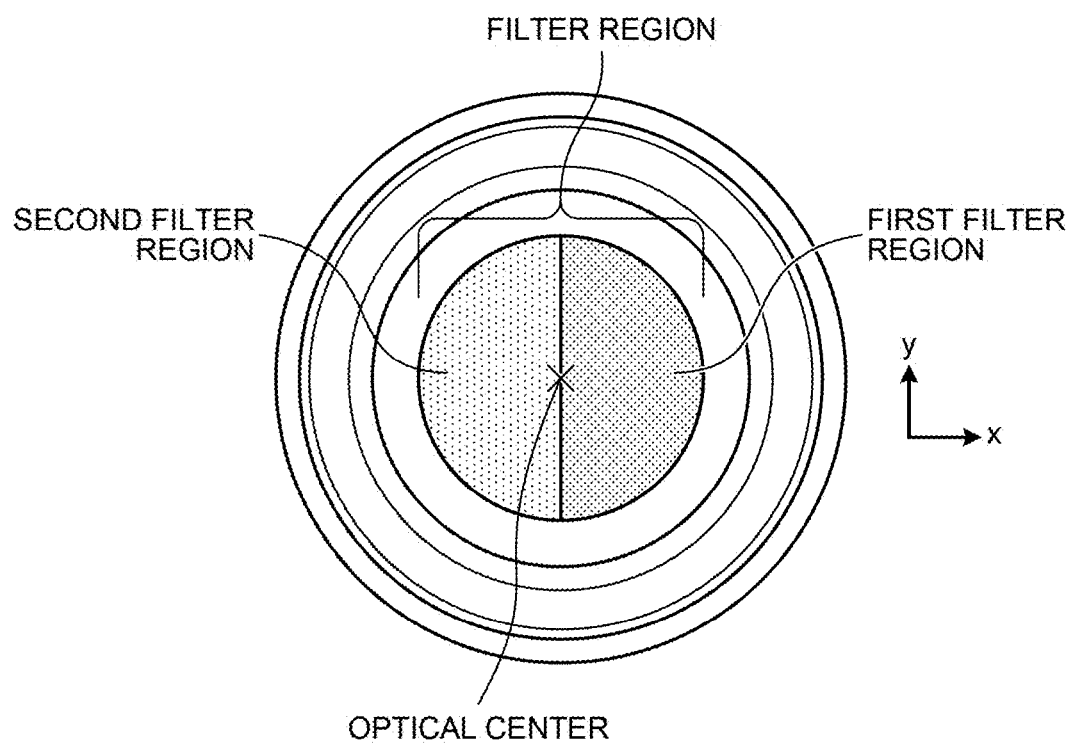
FIG. 12 is a diagram illustrating a configuration of filter regions according to the second embodiment.

FIG. 12 is a diagram illustrating an example of the configuration of the filter regions according to the second embodiment. As illustrated in FIG. 12, a first filter region among the filter regions according to the second embodiment is set so as not to be point-symmetric with respect to the center point (a point located at the centroid) of the filter regions, which is the optical center. Similarly, a second filter region of the filter regions according to the second embodiment is set so as not to be point-symmetric with respect to the center point of the filter regions, which is the optical center. The first filter region and the second filter region have different transmission factor characteristics in any one of the wavelength bands corresponding to the R, G, and B sensors in the image sensor 30. This embodiment describes, as an example, a case where the first filter region is formed as a yellow color correction filter (CC-Y) and the second filter region is formed as a cyan color correction filter (CC-C).

Figure 13:
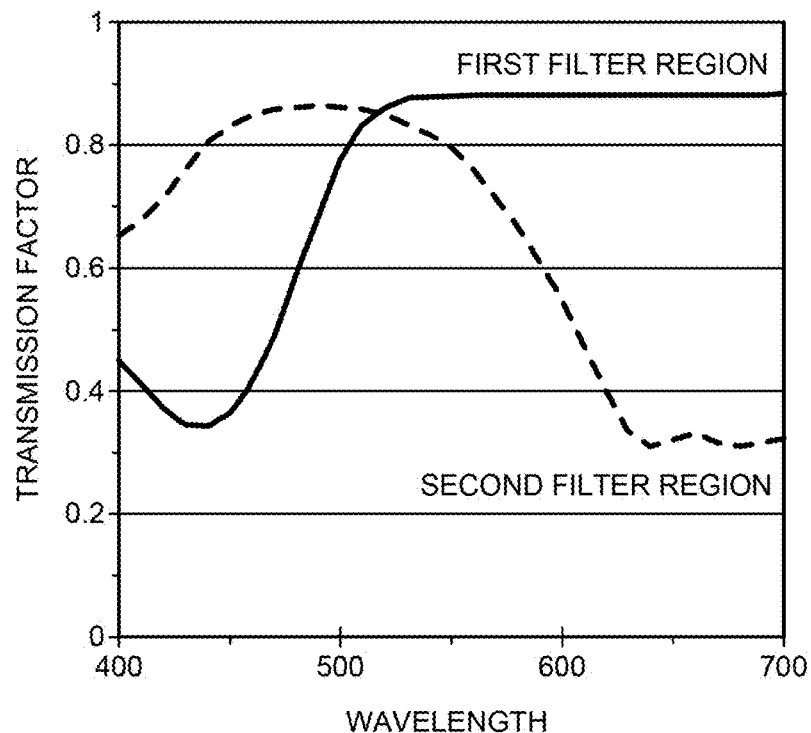
FIG. 13 is a diagram illustrating transmission factor characteristics of the filter regions according to the second embodiment.

FIG. 13 is a diagram illustrating the transmission factor characteristics of the first filter region and the second filter region according to the second embodiment. As illustrated in FIG. 13, the first filter region (CC-Y) transmits light in all of the wavelength bands, namely, red light, green light, and blue light. The second filter region (CC-C) also transmits light in all of the wavelength bands, namely, red light, green light, and blue light. However, the first filter region and the second filter region have different transmission factors for each wavelength. Each of the first filter region and the second filter region may be a filter that changes the transmission factor characteristic for any desired wavelength band, a polarizing filter that allows light polarized in any desired direction to pass therethrough, or a microlens that changes light concentration power for any desired wavelength band. For example, the filter that changes the transmission factor for any desired wavelength band may be a primary color filter (RGB), a complementary color filter (CMY), a color correction filter (CC-RGB/CMY), an infrared cut filter, an ultraviolet cut filter, a neutral density (ND) filter, or a shielding plate. When at least either of the first filter region and the second filter region is a microlens, the lens 20 brings the distribution of concentration of light rays to a lopsided state, so that a point spread function changes.

The image sensor 30 receives light for which a point spread function is changed through the first filter region and the second filter region, the light being included in light having passed through the filter regions, and generates a target image. Thus, the sensor controller 110 acquires the target image generated by the image sensor 30 (Step S201). The point spread function for the target image has been changed into a point-asymmetric function through the filter regions. Consequently, blur in the target image appears to be point-asymmetric blur both when the object is on the far side of the focal point (d>0) and when the object is on the near side of the focal point (d<0), and the shape thereof differs between the far and the near sides of the focal point. Specifically, the lopsided state of a blur shape in a target image is determined depending on which filter region, between the first filter region and the second filter region, a more quantity of light observed in each of the wavelength bands of the respective R, G, and B sensors has passed through. When the object is at the focal point (d=0), the target image is an image without blur. In this embodiment, distances in a scene captured as an image are calculated by use of the above-described characteristics of a target image.

In the case of the filter regions illustrated in FIG. 12, all of red light, green light, and blue light are attenuated, pass therethrough, and are received by the image sensor 30. Consequently, all of the R image, the G image, and B image are treated as target images. However, it is not necessary that all of the R image, the G image, and the B image be treated as target images. Of light passing through the filter regions, blue light tends to be absorbed better and attenuated more by a CC-Y filter (the first filter region) than by a CC-C filter (the second filter region). For this reason, when the position of the object is on the far side of the focal point (d>0), blur lopsided to the left as compared with a circular shape is captured; and when the position of the object is on the near side of the focal point (d<0), blur lopsided to the right as compared with a circular shape is captured.

Of light passing through the filter regions, red light tends to be absorbed better and attenuated more by the CC-C filter (the second filter region) than by the CC-Y filter (the first filter region). For this reason, when the position of the object is on the far side of the focal point (d>0), blur lopsided to the right as compared with a circular shape is captured; and when the position of the object is on the near side of the focal point (d<0), blur lopsided to the left as compared with a circular shape is captured.

Of light passing through the filter regions, green light tends to be absorbed better and attenuated more by a CC-Y filter (the first filter region) than by a CC-C filter (the second filter region). For this reason, when the position of the object is on the far side of the focal point (d>0), blur lopsided to the right as compared with a circular shape is captured; and when the position of the object is on the near side of the focal point (d<0), blur lopsided to the left as compared with a circular shape is captured.

The distance calculator 220 generates a second reference image obtained by correcting, into any desired shape, blur in any one sensor image (target image) selected from a plurality of sensor images acquired by the sensor controller 110 (Step S202). A technique for correcting blur in a sensor image (target image) into any desired shape is the same as that applied at Step S103 described above. As described above in connection with Step S101, a blur shape in a sensor image (target image) varies by the distance d to an object captured in the image. Assuming the distance to an object captured in the image is the distance d of any desired value, the distance calculator 220 generates a second reference image obtained by correcting a blur shape in a sensor image (target image) through a second convolution kernel that has been produced. This embodiment is described on the assumption that the blur shape in the second reference image is circular; however, the blur shape in the second reference image may be a blur shape in any desired sensor image (target image) or may be any other blur shape. The following description illustrates, taking the filter regions illustrated in FIG. 12 as an example, a case where all sensor images are treated as target images. That is, even when the sensor images include a reference image, the same technique can be applied to all the sensor images for correction.

The second convolution kernel $f'_c(d)$ that corrects blur in a target image $Ix_o$ freely selected and that corrects the blur shape in the second reference image can be expressed by Mathematical Formula (8) with the point spread function $f_r(d)$ for the reference image in Mathematical Formula (5) replaced by the assumed point spread function $f'_c(d)$ for the second reference image.

$$f'_c(d) = f_r(d) * f_c^{-1}(d) \qquad (8)$$

Furthermore, the second reference image $Ix\hat{}'_r(d)$ obtained by correcting blur in the target image $Ix_o$ using the second convolution kernel $f'_c(d)$ found from Mathematical Formula (8) can be expressed as Mathematical Formula (9). These calculations can result in generation of the second reference image in the case assuming that the distance to the object is d.

$$Ix\hat{}'_r(d) = f'_c(d) * Ix_o \qquad (9)$$

The distance calculator 220 generates a restored image obtained by correcting blur in a sensor image (target image) other than the sensor image selected at Step S202, into blur in the second reference image (Step S203). A technique for correcting blur in a target image into blur in a restored image is the same as that applied at Step S103 described above. Using Mathematical Formula (8) given above, the distance calculator 220 finds the convolution kernel $f'_c(d)$ that corrects blur in the target image $Ix_o$ freely selected and that corrects the blur shape in the second reference image. Using the convolution kernel $f'_c(d)$ thus found, the distance calculator 220 then generates the restored image obtained by correcting the blur in the target image $Ix_o$ selected at Step S203. Here, if $Ix\hat{}'_o(d)$ denotes the restored image obtained by correcting the blur shape in the target image $Ix_o$ into the blur shape in the second reference image, the restored image can be expressed as Mathematical Formula (10). These calculations can result in generation of the restored image in the case assuming that the distance to the object is d.

$$Ix\hat{}'_o(d) = f'_c(d) * Ix_o \qquad (10)$$

The distance calculator 220 then compares the generated restored image $Ix\hat{}'_o(d)$ and the second reference image $Ix\hat{}'_r(d)$ with each other to determine whether the blur shapes in the restored image $Ix\hat{}'_o(d)$ and the second reference image $Ix\hat{}'_r(d)$ coincide with each other (Step S204). If the blur shapes in the restored image $Ix\hat{}'_o(d)$ and the second reference image $Ix\hat{}'_r(d)$ coincide with each other (Yes at Step S204), the distance calculator 220 ends the processing. On the other hand, if the blur shapes in the restored image $Ix\hat{}'_o(d)$ and the second reference image $Ix\hat{}'_r(d)$ do not coincide with each other (No at Step S204), the distance calculator 220 executes processing at Step S202 again. A technique for finding the distance of d with which the blur shapes in the restored image $Ix\hat{}'_o(d)$ and the second reference image $Ix\hat{}'_r(d)$ best coincide with each other is the same as that applied at Step S104 described above. For example, in this embodiment, Color Alignment Measure is employed, which utilizes a characteristic of color components of a natural image that the components locally have a linear relation therebetween.

In Color Alignment Measure, an indicator L representing a correlation is calculated from the variance of the color distribution in a local border region having a target pixel in a captured image at its center. That is, an indicator L(d) is calculated in a local region having, at its center, each pixel in an RGB image generated from the second reference image $Ix\hat{}'_r(d)$ and the restored image $Ix\hat{}'_o(d)$ that have been obtained for the assumed distance d. In the case of the filter regions illustrated in FIG. 12, the indicators L(d) are calculated by Mathematical Formula (11) for: each of the second reference images obtained by correcting, through the second convolution kernel corresponding to the distance d, the R image, the G image, and the B image that have been captured by the image sensor 30; and each pixel in a color image generated from $R\hat{}(d)$, $G\hat{}(d)$, and $B\hat{}(d)$, which are restored images each corrected through a convolution kernel.

$$L(d) = \lambda_0 \lambda_1 \lambda_2 / \sigma_{R(d)}^2 \sigma_{G(d)}^2 \sigma_{B(d)}^2 \qquad (11)$$

These calculations allow the distance calculator 220 to determine at Step S204 whether each of the indicators L(d) is less than a threshold, and, if the indicator L(d) is less than the threshold, ends the distance estimation for the corresponding pixel. If the indicator L(d) is not less than the threshold, the distance calculator 220 returns to processing at Step S202 to generate the second reference image and the restored images for the distance of d having a different value. The calculation method for the distance to an object captured in each pixel is not limited to condition determination using a threshold. The distance calculator 220 may calculate all values of the indicator L(d) corresponding to all assumed values for the distance of d, and find the value of the distance d that minimizes the indicator L(d).

As described above, in this embodiment, a second reference image and restored images are generated, which are obtained in such a manner that a blur shape in a target image, after being changed in accordance with the filter regions, is corrected into blur of any desired shapes corresponding to the assumed distances d. Subsequently, the distance d that results in the generated second reference image and restored image that have the highest correlation with each other is found, so that the distance to an object captured in an image is calculated. According to this embodiment, the distance is calculated with the correlation of an image the sampling position of which coincides with that of a point spread function, so that highly accurate distance estimation can be implemented. Furthermore, according to this embodiment, blur information is utilized, which is a result of convolution of spatial information. The distance estimation is therefore stable, so that highly accurate distance estimation can be implemented without involvement of a repetitive pattern and the hidden surface problem.

Third Embodiment

Figure 14:
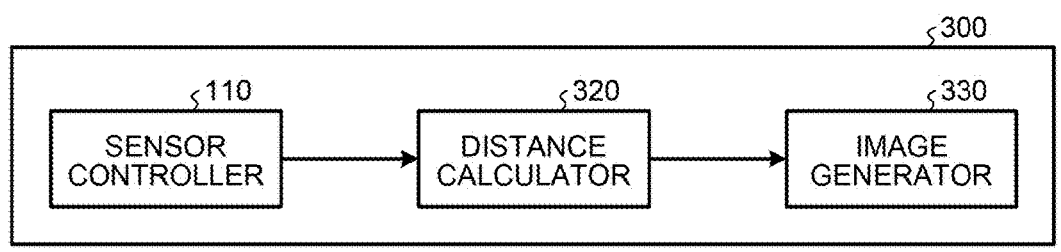
FIG. 14 is a block diagram illustrating a functional configuration of an image capturing apparatus according to a third embodiment.

FIG. 14 is a block diagram illustrating an example of the functional configuration of an image capturing apparatus 300 according to the third embodiment. In the third embodiment, the same reference signs are given to the same components as those in the image capturing apparatus 100 in the first embodiment, and detailed description of such components may be omitted. Specifically, the third embodiment differs from the first embodiment in the functions of a distance calculator 320 and an image generator 330, which are described below. The hardware configuration of the image capturing apparatus 300 according to the third embodiment is the same as the hardware configuration of the image capturing apparatus 100 according to the first embodiment.

As illustrated in FIG. 14, the image capturing apparatus 300 includes the sensor controller 110, the distance calculator 320, and the image generator 330. The sensor controller 110, the distance calculator 320, and the image generator 330 may be implemented partially or entirely by software (computer programs) or by hardware circuitry. The image capturing apparatus 300 captures an image of any desired object and generates a display image to be displayed to a user.

In addition to a distance image representing the distance to an object captured in an image, the distance calculator 320 outputs, to the image generator 330, a blur-restored image generated from a restored image and a reference image. The restored image is obtained by convoluting blur kernel to a target image through a convolution kernel that results in the highest correlation with the reference image. Using the distance image output by the distance calculator 320 and the restored image obtained by correcting a blur shape in a sensor image, the image generator 330 generates a display image to be displayed to a user. The display image generated by the image generator 330 is output by being displayed on the display 70 or the like.

Figure 15:
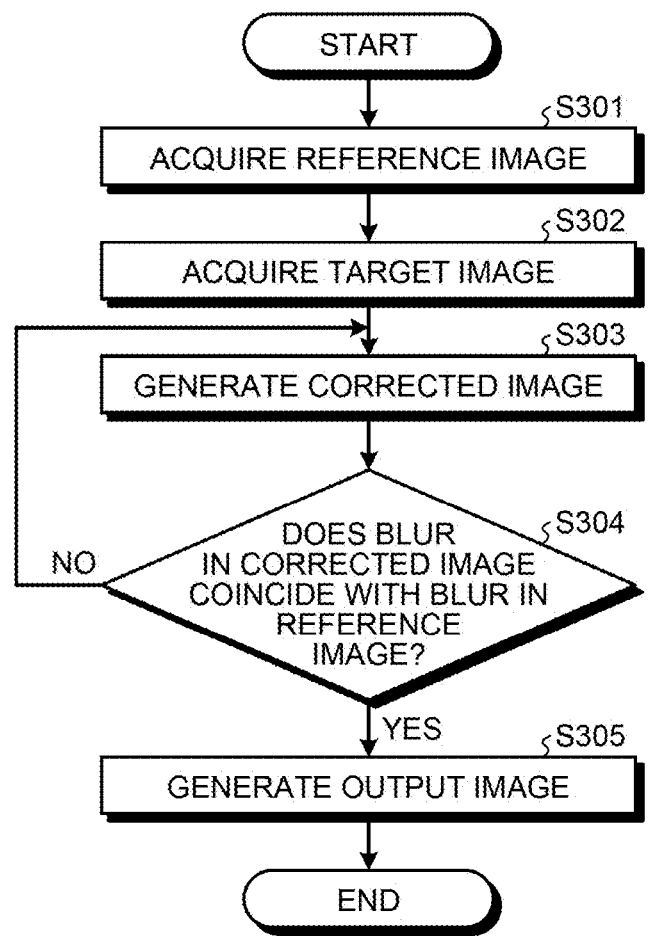
FIG. 15 is a flowchart illustrating a procedure of image processing according to the third embodiment.

FIG. 15 is a flowchart illustrating an example of the procedure of image processing according to the third embodiment. Processing at Step S301 to Step S304 is the same as the above-described processing at Step S101 to Step S104, and detailed description of these phases of processing is omitted.

As illustrated in FIG. 15, based on a distance image output by the distance calculator 320 and indicating depth information on each pixel and based on the restored image in which a blur shape is coincide with that in a sensor image thereof, the image generator 330 generates a display image (output image) to be displayed to a user (Step S305). The display image may be the distance image or may be the distance image displayed in false colors. Alternatively, the display image may be the restored image or a sensor image. The restored image is an image obtained by correcting blur in a target image into blur in the reference image. Alternatively, the display image may be an all-in-focus image obtained by removing defocus blur in each pixel in the restored image in accordance with the distance of a corresponding object, based on the distance image and the restored image. Alternatively, the display image may be a blur-enhanced image obtained by, based on the restored image and the distance image, removing blur from or convoluting blur kernel to an object located at any desired distance in the restored image, in accordance with the distance of a corresponding object.

Fourth Embodiment

There has been a proposed technique for enabling a highly accurate approximate solution of a general labeling problem with discrete values based on a Markov random field to be found at high speed with the application of cost volume filtering. In a distance measuring method available with the application of such a technique, it is sometimes impossible to find distances in a flat region, which provides no clue.

In a fourth embodiment, more highly accurate measurement of distances is enabled with the application of cost volume filtering. In this embodiment, the difference between a label (for example, a distance) determined for a higher hierarchical layer and a label for a lower hierarchical layer in the hierarchized cost volumes is used as a regularization term in selecting a label for the lower hierarchical layer. Labels for a lower hierarchical layer are thus optimized with optimized labels for a higher hierarchical layer used as spatial constraints. Consequently, it is made possible, for example, to determined distances in a flat region compensating subtle irregularities of objects. This embodiment also makes it possible to enhance the robustness against external disturbances such as imaging noise by implementing regularization using optimized results in each hierarchical layer.

The following description mainly illustrates a case where cost volume filtering is applied to the first embodiment. The same technique can be applied also to the second and the third embodiments.

Figure 16:
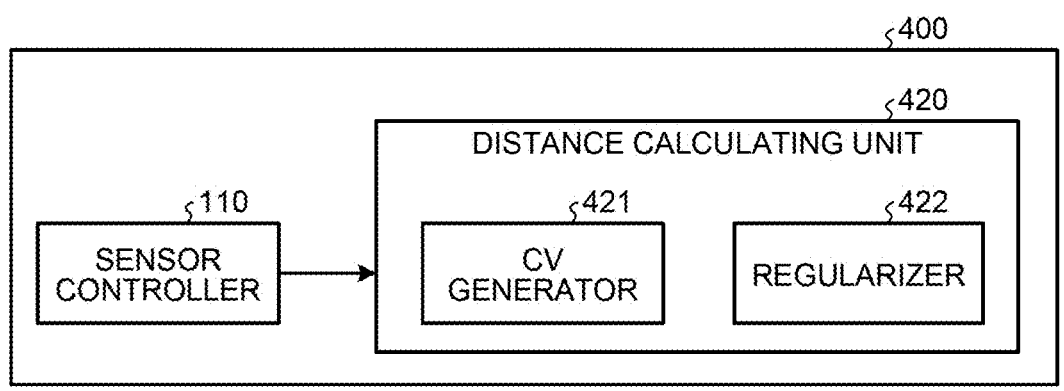
FIG. 16 is a block diagram illustrating a functional configuration of an image capturing apparatus according to a fourth embodiment.

FIG. 16 is a block diagram illustrating an example of the functional configuration of an image capturing apparatus 400 according to the fourth embodiment. In this embodiment, the same reference signs are given to the same components as those in the image capturing apparatus 100 in the first embodiment, and detailed description of such components may be omitted. This embodiment differs from the first embodiment in the function of a distance calculator 420. The hardware configuration of the image capturing apparatus 400 according to this embodiment is the same as the hardware configuration of the image capturing apparatus 100 according to the first embodiment.

As illustrated in FIG. 16, the image capturing apparatus 400 includes the sensor controller 110 and the distance calculator 420. The sensor controller 110 and the distance calculator 420 may be implemented partially or entirely by software (computer programs) or by hardware circuitry. As in the case of the first embodiment, the image capturing apparatus 400 captures an image of any desired object and generates a distance image that indicates information on the depth to the object.

The distance calculator 420 includes a cost volume (CV) generator 421 and a regularizer 422.

The CV generator 421 generates cost volumes in three dimensions. Each of the cost volumes is data of three dimensions including not only information in a first direction (for example, the horizontal direction) in an image and information on a second direction (for example, the vertical direction) therein different from the first direction, but also information on the label direction therein. The cost volume includes information in three dimensions that indicates positions in the image in the horizontal direction, positions in the image in the vertical direction, and costs based on differences between a target image and a reference image. The cost is calculated, for example, with respect to each of the assumed distances (labels) to objects captured in the respective pixels. The difference between a target image and a reference image is, for example, the difference between signal values thereof, or the difference between values yielded using a similarity evaluation technique. Although distances correspond to the labels in this case, the labels are not limited to being distances. For example, information indicating degrees of blur, which vary depending on distances, may be defined as the labels. The labels may be, for example, parallax directions.

The CV generator 421 also generates a cost volume obtained by reducing resolutions of another cost volume at least in a one-dimensional direction. For example, the CV generator 421 generates cost volumes (a cost volume pyramid) structured in hierarchical layers the number of which is n (where n is an integer of 2 or higher) in which resolutions of information at least in a direction of one of the three dimensions are reduced in such a manner that the resolution in a higher hierarchical layer is lower. The number n of hierarchical layers is any desired number and only needs to be at least two.

The following description mainly illustrates a case where resolutions in the horizontal direction and in the vertical direction of the cost volumes are reduced. However, resolutions in any one or more directions other than the directions above may be reduced. For example, resolutions in the label direction may be reduced in addition to those in the horizontal direction and in the vertical direction. This configuration enables more high-speed processing.

The regularizer 422 adjusts a cost volume in the k-th hierarchical layer (k is an integer that satisfies $1 \leq k \leq (n-1)$) into a cost volume (adjusted cost volume) that includes a regularization term. The regularization term is found as a term based on the difference between a distance (first distance) found from a cost volume in the (k+1)-th hierarchical layer and a distance (second distance) found from a cost volume in the k-th hierarchical layer. For example, the regularizer 422 determines the distances to objects captured in the respective pixels, from a cost volume having a lower resolution (a cost volume in the (k+1)-th hierarchical layer), and then calculates a cost volume C' (adjusted cost volume). The cost volume C' is obtained by adding to a cost volume having a higher resolution (a cost volume in the k-th hierarchical layer), as a regularization term, the difference between a distance found from the cost volume having a lower resolution and the distance from the cost volume having a higher resolution (a cost volume in the k-th hierarchical layer).

The distance calculator 420 calculates a distance image based on the cost volumes C' calculated by the regularizer 422.

Figure 17:
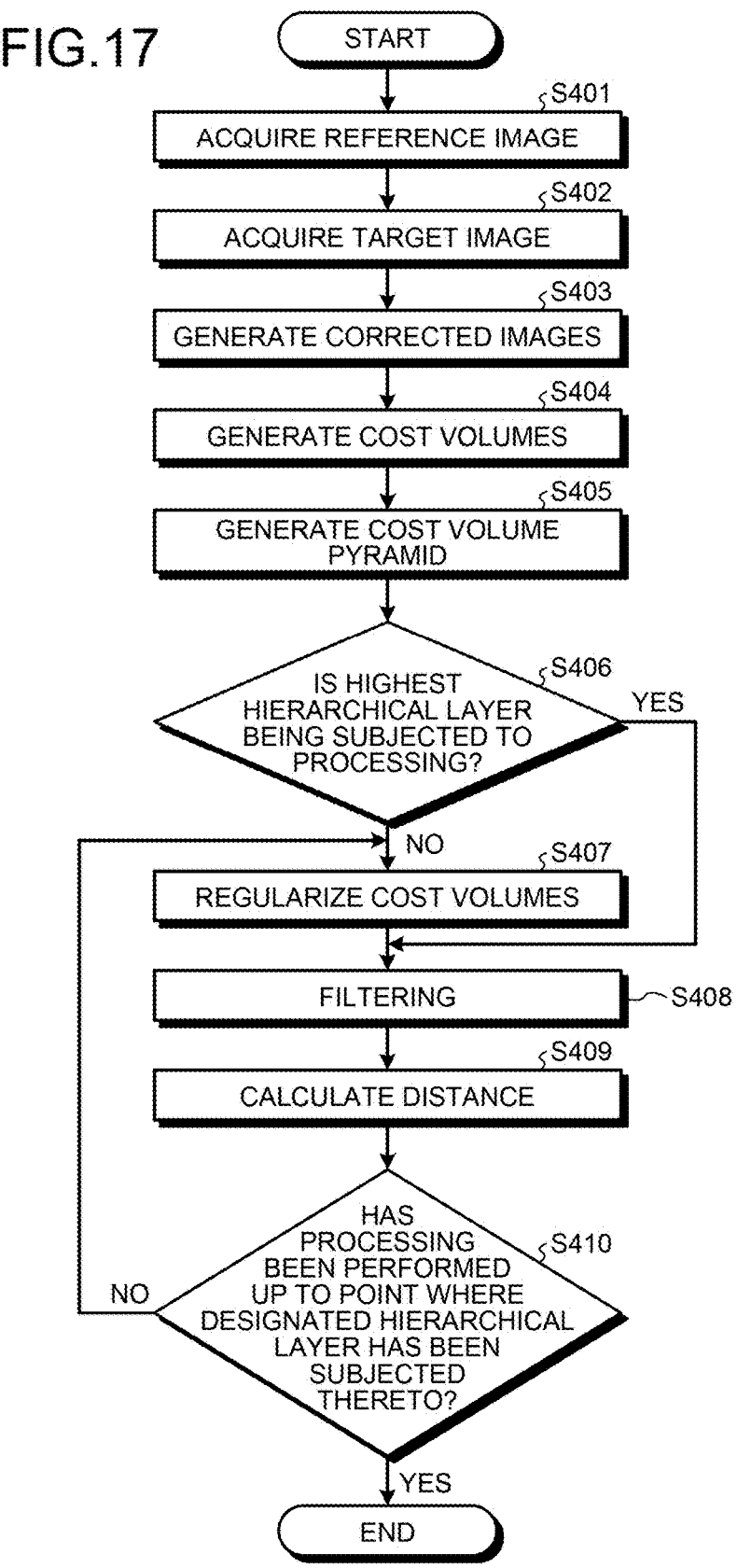
FIG. 17 is a flowchart illustrating a procedure of image processing according to the fourth embodiment.

Next, details of operation of the image capturing apparatus 400 according to this embodiment are described. FIG. 17 is a flowchart illustrating an example of the procedure of image processing according to the fourth embodiment.

The sensor controller 110 acquires a reference image generated by the image sensor 30 (Step S401). The sensor controller 110 also acquires a target image generated by the image sensor 30 (Step S402). The distance calculator 420 convolutes, to the target image, blur kernels that vary depending on assumed values of the distance, thereby generating a plurality of restored images obtained by correcting the blur shape in the target image (Step S403).

The CV generator 421 generates a cost volume from the reference image and the restored image (Step S404). For example, the CV generator 421 calculates, as matching costs (costs), the differences each between the reference image and a restored image generated by convoluting blur kernel of one of the various forms. The CV generator 421 finds, as costs for one pixel, the degrees of coincidence each between the reference image and the restored image in a rectangular region of any desired size that has the one pixel at its center, for example, as in the case of Step S104. With respect to each pixel, a plurality of costs are calculated that correspond to the respective restored images generated variously depending on distances. The CV generator 421 calculates a cost volume from the plurality of costs that have been calculated. For example, the CV generator 421 generates cost volumes of three dimensions including the position of each pixel in the horizontal direction, the position of the pixel in the vertical direction, and the costs found with respect to the pixel.

The CV generator 421 further generates a cost volume pyramid based on the cost volumes (Step S405). The CV generator 421 generates the cost volume pyramid by generating cost volumes in three dimensions in which resolutions at least in a direction of one of the three dimensions are reduced in a stepwise manner.

For example, the CV generator 421 reduces resolutions in the cost volumes in the horizontal direction and in the vertical direction. The CV generator 421 reduces each slice of cost volumes by an existing reduction method (such as the area averaging method, the cubic convolution method, the nearest neighbor method, or the bilinear method). The CV generator 421 generates low-resolution cost volumes including a cluster of cost volume slices obtained by reducing resolutions in the horizontal direction and in the vertical direction. The cost volume pyramid includes cost volumes in which the stepwise reductions are applied to hierarchical layers up to the n-th hierarchical layer, where n is any desired number.

The regularizer 422 executes the following processing from higher to lower hierarchical layers starting from the highest hierarchical layer (a hierarchical layer of the lowest resolution), thereby calculating the distances to objects. At the start, the regularizer 422 determines whether a layer currently undergoing the processing (the k-th hierarchical layer) is the highest hierarchical layer (Step S406). If the k-th hierarchical layer is the highest hierarchical layer (Yes at Step S406), the regularizer 422 sets a cost volume $C^k$ for the k-th hierarchical layer to $C'^k$, and then proceeds to Step S408. As described here, when the k-th hierarchical layer is the highest hierarchical layer, processing for regularizing the cost volumes is not executed because the differences between each of the distance for this hierarchical layer and a corresponding distance in a higher hierarchical layer cannot be calculated.

If the k-th hierarchical layer is not the highest hierarchical layer (No at Step S406), the regularizer 422 regularizes the cost volume $C^k$ (Step S407). For example, the regularizer 422 generates the cost volume $C'^k$ obtained by adjusting the cost volume $C^k$ with a regularization term added thereto. The regularizer 422, as is expressed by Mathematical Formula (12), calculates the adjusted cost volume $C'^k$ for the k-th hierarchical layer by using the cost volume $C^k$ for the k-th hierarchical layer as a data term and using, as a regularization term, the difference between a distance $\hat{b}_i^{(k+1)}$ found for a higher hierarchical layer and a distance b found for the k-th hierarchical layer.

$$C'^k_i(b) = C^k_i(b) + \lambda \|b - \hat{b}_i^{k+1}\|_{L1} \quad (12)$$

Here, $\lambda$ is a regularization parameter. The parameter $\lambda$ may be a constant or may be determined so as to be less powerful for a higher hierarchical layer. The expression "L1" indicates that the L1 regularization is applied as a regularization method. The regularization method is not limited to the L1 regularization, and another regularization method such as the L2 regularization may be used. While the suffix i indicates each pixel, the variable b indicates a distance. Mathematical Formula (12) represents a process of regularizing a cost volume with respect to each pixel i at the distance b by applying Mathematical Formula (12) thereto. The cost volumes regularized for the respective distances b and the respective pixels i are collectively denoted as $C'^k$ in some cases.

The distance calculator 420 carries out cost volume filtering (CVF) on the cost volume $C'^k$ (Step S408). CVF is image filtering processing adapted to each slice of cost volumes. In CVF, filtering processing based on a filter such as an edge-preserving FGWLS (Fast Global Image Smoothing Based on Weighted Least Squares) filter, a Gaussian filter, a bilateral filter, a box filter, a guided filter, or an ε-filter is adapted to each slice of cost volumes. The following description illustrates a case where a FGWLS filter is used.

The distance calculator 420 adapts the FGWLS filter to the cost volume $C'^k$ to calculate a cost volume $C''^k$ as expressed by Mathematical Formula (13).

$$C''^k_i(b) = F_{FGWLS}\{C'^k_i(b)\} \quad (13)$$

The distance calculator 420 then calculates, from the cost volume $C''^k$, the distance $\hat{b}_i^k$ to an object captured in each pixel (Step S409). For example, as expressed by Mathematical Formula (14), the distance calculator 420 selects, with respect to each pixel i, the distance $\hat{b}_i^k$ that corresponds to the smallest cost among the cost volumes $C_i''^k(b)$. The distance does not need to be an integer, and may be retained as a decimal after calculating a weighted average using the relation between distances and costs.

$$\hat{b}_i^k = \underset{b}{\mathrm{argmin}}\{C_i''^k(b)\} \quad (14)$$

The distance calculator 420 determines whether the processing has been performed up to the point where a hierarchical layer designated by a user or the like (a designated hierarchical layer) has been subjected thereto (Step S410). If the processing has not been thus completed (No at Step S410), the distance calculator 420 returns to Step S407, and the processing is repeated. If the processing has been thus completed (Yes at Step S410), the distance calculator 420 ends the image processing. It is not needed that the distance calculation be performed up to the point where the lowest hierarchical layer has been subjected thereto. In accordance with such a factor as a desired level of accuracy, the processing may be ended when it comes to the point where a hierarchical layer higher than the lowest hierarchical layer (the designated hierarchical layer) has been subjected thereto.

Figure 18:
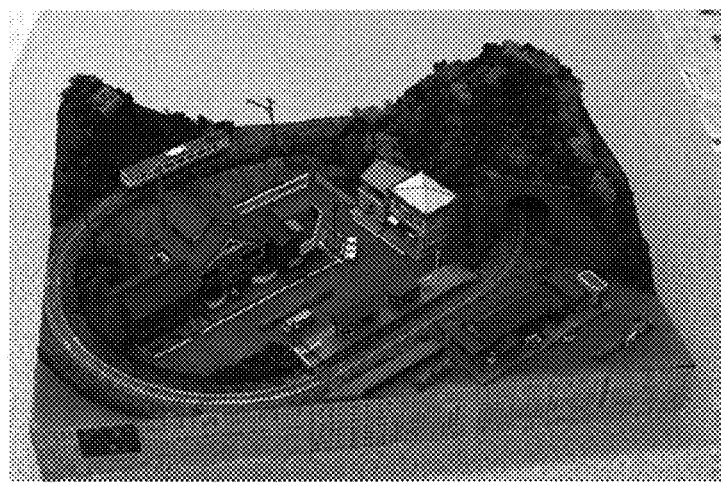
FIG. 18 is a diagram illustrating an exemplary result of the processing according to the fourth embodiment.
Figure 19:
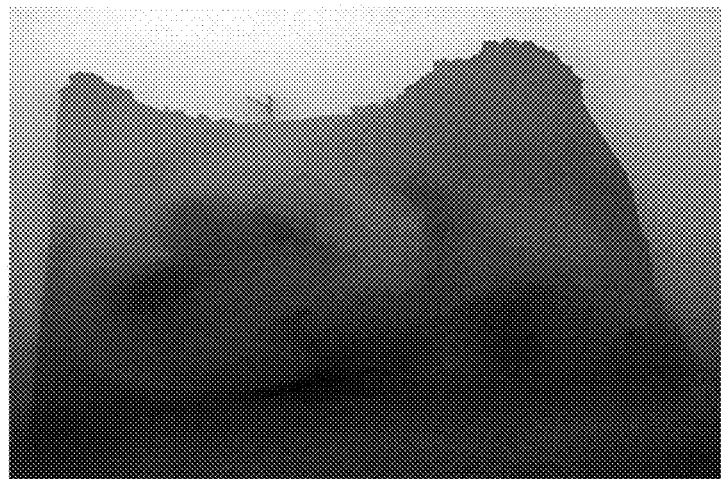
FIG. 19 is a diagram illustrating an exemplary result of the processing according to the fourth embodiment.

The distance calculator 420 may output a distance image indicating the calculated distances. FIG. 18 is a diagram illustrating an exemplary captured image. FIG. 19 is a diagram illustrating an exemplary distance image generated based on the captured image in FIG. 18. The distance image in FIG. 19 illustrates a result of finding the distances to objects, based on the captured image illustrated in FIG. 18. In FIG. 19, while an object located nearer is displayed more darkly, an object located more distantly is displayed more brightly. The distance image may be generated with a resolution corresponding to the designated hierarchical layer or may be generated with a higher resolution (such as the resolution corresponding to the lowest hierarchical layer).

As described above, according to this embodiment, the difference with a distance determined for a higher hierarchical layer in the hierarchized cost volumes is used as a regularization term in selecting a distance for a lower hierarchical layer. Distances for a lower hierarchical layer are thus optimized with optimized distances for a higher hierarchical layer used as spatial constraints. Consequently, it is made possible to determine distances in a flat region while compensating subtle irregularities of objects. This embodiment makes it possible to enhance the robustness against external disturbances such as imaging noise by implementing regularization using optimized results in each hierarchical layer.

Modification 1

In Mathematical Formula (12), the difference with a distance determined for one higher hierarchical layer is used as a regularization term. The differences with distances found for two or more of the higher hierarchical layers may be used as individual regularization terms. For example, not only the difference between the distance b for the k-th hierarchical layer and the distance $\hat{b}_i^{(k+1)}$ for the (k+1)-th hierarchical layer but also the difference (a third difference) between the distance b for the k-th hierarchical layer and the distance $\hat{b}_i^{(k+2)}$ for the (k+2)-th hierarchical layer may be added as regularization terms. In this case, the same regularization parameter or different regularization parameters may be used for the respective differences.

Modification 2

The filtering processing (at Step S408, for example) may be configured as filtering processing in which the captured image is used as a guide. In this case, for example, the CV generator 421 receives a captured image as additional input, and generates an image pyramid (a cluster of images) structured in hierarchical layers the number of which is n in which resolutions of the captured image in the horizontal direction and the vertical direction are reduced in a stepwise manner into the same resolutions as are in the cost volume pyramid. The distance calculator 420 calculates the cost volume $C''^k$ by adapting, to each slice of the cost volume $C'^k$, filtering processing in which an image in the k-th hierarchical layer in the image pyramid is used as a guide.

Modification 3

In reducing resolutions of cost volumes, weighted averages using specific information as weights may be used. For example, information such as "1—the minimum cost for a corresponding pixel", the estimated value of saturation for the pixel, the edge strength (for example, edge strength in the horizontal direction) of the pixel, or the edge slope direction of the pixel can be used as weights α. From these kinds of information, two or more kinds may be combined to be used as the weights α. Alternatively, in reducing resolutions of cost volumes, an approach of reducing resolutions of cost volumes by using the image pyramid of the captured image as a guide may be used.

Modification 4

The description above discusses embodiments for calculating distances using an image captured from one viewpoint that has been acquired by one imaging unit (image sensor). A method that employs cost volume filtering as in the fourth embodiment can be applied also to a scheme for calculating distances using images captured from multiple viewpoints. An image capturing apparatus in this modification, for example, receives at least two images captured from different viewpoints as input, treats at least one of the captured images as a target image or target images, and generates a plurality of restored images obtained by correcting the target image or target images with parallax shift amounts corresponding to assumed distances. The image capturing apparatus in this modification calculates, as costs, the differences each between one of the generated restored images and a reference image that is one of the captured images other than the target image or target images. The image capturing apparatus in this modification generates a cost volume using the cost thus calculated. Processing subsequent to this step is the same as the processing in the fourth embodiment.

Modification 5

Output information is not limited to a distance image. An embodiment may be configured to output information of any of the following kinds:

the distance image and cost volumes;
the distance image and the smallest cost among the cost volumes; —information indicating the correspondence relation between distances and positions (such as a table);
at least one of the maximum value, the minimum value, the median, and the average value of distances; and
a result of division into regions corresponding to distances (such as an image indicating regions obtained by the division).

Information of any of the following kinds may be output by processing a captured image using the calculated distances:

an all-in-focus image (an image in which focal points are set to all of the distances);
a refocused image (an image in which a focal point is set to a designated distance);
a result of extraction of an image corresponding to any desired distance; and
a result of object recognition or behavior recognition using images and distances.

Processing procedures, control procedures, specific names, and information including various pieces of data and parameters described in the description above and the drawings can be changed in a discretionary manner unless otherwise specified. Individual constituent components of the apparatuses illustrated in the drawings are functionally conceptual and do not necessarily need to be physically configured as illustrated in the drawings. That is, specific forms of disintegration and integration of each of the apparatuses are not limited to those illustrated in the drawings, and all or a part of them can be configured to be disintegrated or integrated functionally or physically in any desired units depending on various loads and usage conditions.

Furthermore, the image processing functions of each of the image capturing apparatuses according to the embodiments above can be implemented by using a general-purpose computer apparatus as basic hardware, for example. An image processing program to be executed is composed of modules including the respective functions described above. The image processing program to be executed may be recorded and provided as an installable or executable file on a computer-readable recording medium such as a compact disc read only memory (CD-ROM), a compact disc recordable (CD-R), and a digital versatile disc (DVD), or may be preinstalled and provided on a read only memory (ROM) or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processing circuitry configured to:
acquire a target image and a first reference image, a point spread function of the target image being point-asymmetric, a point spread function of the first reference image being point-symmetric;
calculate a distance to an object captured in the target image and the first reference image, in accordance with correlation between an image obtained by convoluting a blur kernel to the target image and the first reference image; and
generate an output image based on the calculated distance; and
an image sensor configured to receive light having passed through a filter region that changes point spread functions for sensor images of at least one kind into point-asymmetric forms to generate the target image, and configured to generate the first reference image, the filter region having a shape that is point-asymmetric.

2. The image processing apparatus according to claim 1, wherein the processing circuitry calculates the distance to the object by finding, from a plurality of convolution kernels that convolute respective different blur kernels to respective target images, the convolution kernel that results in one image from among images obtained by convoluting the different blur kernels to the target images, the one image having the highest correlation with the first reference image.

3. The image processing apparatus according to claim 2, wherein
each of the convolution kernels converts asymmetric blur into symmetrical blur, and
the processing circuitry finds, from the point spread function for the target image and the point spread function for the first reference image, a plurality of the convolution kernels that correct blur of the object positioned at any desired distances.

4. The image processing apparatus according to claim 2, wherein
a color of the target image is different from a color of the first reference image; and the plurality of convolution kernels are each a point spread function for convoluting a blur kernel to the target image to match a blur shape in the target image with a blur shape in the first reference image at a mutually different distance to the object.

5. The image processing apparatus according to claim 1, wherein the processing circuitry calculates the distance to the object in accordance with correlation between an image obtained by convoluting a blur kernel to the target image and a second reference image obtained by convoluting blur kernel to a sensor image detected by a sensor.

6. The image processing apparatus according to claim 1, wherein
the processing circuitry:
generates cost volumes each including information in three dimensions representing positions in one direction, positions in a direction different from the one direction, and costs based on differences between an image obtained by convoluting a blur kernel to the target image and the first reference image, the cost volumes being structured in hierarchical layers the number of which is n (where n is an integer of at least 2) in which resolutions in a direction or directions of at least one of the three dimensions are reduced in such a manner that the resolution in a higher hierarchical layer is lower; and
adjusts the cost volumes in the k-th hierarchical layer (where k is an integer that satisfies $1 \leq k \leq (n-1)$) into adjusted cost volumes each of which includes a regularization term based on a difference between a first distance found from a corresponding one of the cost volumes in the (k+1)-th hierarchical layer and a second distance found from the cost volumes in the k-th hierarchical layer, and
calculates the distance to the object, based on the adjusted cost volumes.

7. The image processing apparatus according to claim 6, wherein the processing circuitry adjusts the cost volumes in the k-th hierarchical layer (where k is an integer that satisfies $1 \leq k \leq (n-1)$) into adjusted cost volumes each of which further includes a regularization term based on at least one differences each between the first distance and a third distance or third distances found from the cost volumes in at least one of the hierarchical layers higher than the k-th hierarchical layer.

8. The image processing apparatus according to claim 6, wherein
the processing circuitry generates cost volumes structured in hierarchical levels the number of which is n in which resolutions along at least one of the dimensions that represent positions in the one direction and positions in the different direction are reduced in a stepwise manner, and
generates a cluster of images from an acquired image, the cluster of images being structured in hierarchical layers the number of which is n in which resolutions in the same dimension or dimensions as with the cost volumes are reduced in a stepwise manner, and calculates the distance to the object in the k-th hierarchical layer by applying, to the adjusted cost volumes, filtering processing in which an image from a corresponding hierarchical layer in the cluster of images is used as a guide.

9. The image processing apparatus according to claim 1, wherein
the processing circuitry calculates at least one of costs and cost volumes based on differences between an image obtained by convoluting a blur kernel to the target image and the first reference image, the cost volumes each including information in three dimensions representing positions in one direction, positions in a direction different from the one direction, and costs based on differences between an image obtained by convoluting a blur kernel to the target image and the first reference image, the cost volumes being structured in hierarchical layers the number of which is n (where n is an integer of at least 2) in which resolutions in a direction or directions of at least one of the three dimensions are reduced in such a manner that the resolution in a higher hierarchical layer is lower.

10. The image processing apparatus according to claim 1, wherein the point spread function for the target image is changed into a form that is point-asymmetric with respect to an optical center of an aperture.

11. The image processing apparatus according to claim 1, wherein
the image sensor includes two or more sensors from a sensor that receives red light, a sensor that receives green light, and a sensor that receives blue light,
a first sensor included among the two or more sensors generates the target image, and
a second sensor included among the two or more sensors other than the first sensor generates the first reference image.

12. The image processing apparatus according to claim 1, wherein the filter region is any one of a primary color filter, a complementary color filter, a color correction filter, an infrared cut filter, an ultraviolet cut filter, a neutral density filter, and a shielding plate, which are filters that change a transmission factor of any desired wavelength band.

13. The image processing apparatus according to claim 1, wherein the filter region is a polarizing plate that allows light polarized in any desired direction to pass therethrough, or a microlens that changes light concentration power for any desired wavelength band.

14. The image processing apparatus according to claim 1, wherein
the processing circuitry generates a distance image representing distances calculated for individual pixels in a sensor image, and generates a restored image obtained by correcting a blur shape in the target image from images obtained by convoluting different blur kernels to the first reference image and to the target image, and
generates the output image obtained by, based on distance information in the distance image, removing blur from or convoluting blur kernel to the restored image.

15. The image processing apparatus according to claim 1, wherein the processing circuitry calculates the distance to the object by using a convolution kernel that corrects asymmetric blur of the target image into symmetric blur of the first reference image.

* * * * *